United States Patent
Chebakov et al.

(10) Patent No.: US 9,292,701 B1
(45) Date of Patent: Mar. 22, 2016

(54) SYSTEM AND METHOD FOR LAUNCHING A BROWSER IN A SAFE MODE

(71) Applicant: Kaspersky Lab ZAO, Moscow (RU)

(72) Inventors: Mikhail S. Chebakov, Moscow (RU); Igor S. Maslov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/747,056

(22) Filed: Jun. 23, 2015

(30) Foreign Application Priority Data

Apr. 24, 2015 (RU) .................................. 2015115352

(51) Int. Cl.
- G06F 21/00 (2013.01)
- G06F 21/62 (2013.01)
- H04L 29/08 (2006.01)

(52) U.S. Cl.
CPC ................ G06F 21/62 (2013.01); H04L 67/02 (2013.01); H04L 67/10 (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 8,528,076 B2 * | 9/2013 | Lin | ........................ | G06Q 20/12 726/21 |
| 8,839,422 B2 * | 9/2014 | Ghosh | ...................... | G06F 9/54 713/188 |
| 2007/0250863 A1 * | 10/2007 | Ferguson | ............. | H04H 20/106 725/46 |
| 2008/0134093 A1 * | 6/2008 | Dharmarajan | .... | G06F 17/30864 715/838 |
| 2008/0195954 A1 * | 8/2008 | Dharmarajan | .... | G06F 17/30867 715/749 |
| 2009/0217258 A1 * | 8/2009 | Wenzinger | ................ | G06F 8/62 717/173 |
| 2009/0271707 A1 * | 10/2009 | Lin | ................... | G06F 17/30893 715/738 |
| 2013/0046869 A1 * | 2/2013 | Jenkins | ............. | G06F 17/30864 709/223 |
| 2014/0068412 A1 * | 3/2014 | He | ............................ | G06F 9/50 715/234 |
| 2014/0325566 A1 | 10/2014 | Roberts et al. | | |
| 2014/0351889 A1 * | 11/2014 | Liu | ........................ | H04L 63/10 726/3 |
| 2015/0074513 A1 | 3/2015 | Liang et al. | | |

FOREIGN PATENT DOCUMENTS

EP    2 790 121 A1    10/2014
WO    2015043428 A1    4/2015

* cited by examiner

*Primary Examiner* — Morshed Mehedi
(74) *Attorney, Agent, or Firm* — Arent Fox LLP; Michael Fainberg

(57) ABSTRACT

Disclosed is a system and method for launching a web browser in a safe mode. An example method includes intercepting a request from the web browser to access data from a server; determining whether the browser is required to operate in a safe mode when displaying data from the server; when the browser is required to operate in the safe mode, analyzing the data received from the server; when the received data includes a webpage, generating a temporary webpage containing a script for evaluating at least one criterion for determining whether to display the webpage received from the server by the browser; executing the script contained in the temporary webpage by the browser; and based on an evaluation result of the at least one criterion by the script, launching the browser in the safe mode to display the webpage received from the server.

20 Claims, 3 Drawing Sheets

SYSTEM AND METHOD FOR LAUNCHING A BROWSER IN A SAFE MODE

CROSS-REFERENCE TO RELATED APPLICATIONS

This application claims benefit of priority under 35 U.S.C. 119(a)-(d) to a Russian Application No. 2015115352 filed on Apr. 24, 2015, which is incorporated by reference herein.

FIELD OF TECHNOLOGY

The present disclosure relates to the field of computer security, and more specifically, to a system and method of launching a web browser in safe mode.

BACKGROUND

Currently, there are a substantial number of websites on which navigation requires a secure connection. Such sites are, for example, banking sites or payment system sites (e.g., sites with Internet banking). In some cases, the existing protected data transmission protocols (such as HTTPS) are not sufficient for communicating data with these websites, since malicious applications may be present on the user's devices and may gain access to confidential information whose loss can result in financial losses to the user if used by hackers.

The existing security applications (e.g., antivirus software applications) have additional protection capabilities. Thus, for example, a browser can operate in a safe mode in which all changes to the browser's settings, configuration, etc. (e.g., saved files, cookies, history of websites visited, and the like) remain in the secure environment and do not get into the main operating system, that is, they cannot be accessed by hackers, in general, when accessing an Internet banking website, the security application may automatically launch the Web browser in safe mode.

However, using a browser in safe mode may disturb the ordinary comfortable operation of the user in some instances. For example, the browser may be automatic launched in a safe mode even when it is not necessary. For example, in the case of launching a browser that uses "tiles" (i.e., a sample graphic image of the contents of a webpage), if there is an Internet banking website among the often visited sites of the user, the browser may be automatically launched in a safe mode. In another example, if the browser uses different extensions (i.e., so-called "plug-ins") that access Internet banking website, the browser may also be automatically launched in the safe mode even if it is not necessary.

Accordingly, there is a need for a more effective mechanism for determining whether to launch a web browser in a safe or unsafe mode.

SUMMARY

Disclosed are systems, methods and computer program products for launching a web browser in safe mode. In one aspect, the method includes intercepting a request from the web browser to access data from a server; determining whether the browser is required to operate in a safe mode when displaying data from the server; when the browser is required to operate in the safe mode, analyzing the data received from the server; when the received data includes a webpage, generating a temporary webpage containing a script for evaluating at least one criterion for determining whether to display the webpage received from the server by the browser; executing the script contained in the temporary webpage by the browser; and based on an evaluation result of the at least one criterion by the script, launching the browser in the safe mode to display the webpage received from the server.

In another aspect, determining whether the browser is required to operate in the safe mode includes determining a category of the server based on at least one of contents of the server and at least one security policy associated with the server.

In another aspect, the at least one criterion includes at least one of whether the webpage is currently displayed in an active window of the browser, whether a delayed event has occurred relating to the display of the webpage by the browser, and whether the webpage is currently displayed from a frame of the browser.

In another aspect, the method includes detecting a change in at least one condition used by the script to evaluate the at least one criterion; and restarting the script if to evaluate the at least one criterion if the change in the at least one condition is detected.

In another aspect, the method includes displaying the response on the browser in an unsafe mode if the analyzed response is not a webpage.

In another aspect, the script of the temporary webpage contains an original URL of the webpage.

In another aspect, wherein, when the script has not completed an evaluation of the at least one criterion, the method comprises setting a cookie for the webpage to indicate that execution of the trigger to launch the browser in the safe mode should not be performed.

In another aspect, a system is disclosed for launching a web browser in a safe mode. In this aspect, the system includes a hardware processor configured to intercept a request from the browser to access electronic information from a server; determine a category of the server to indicate whether interaction between the browser and the server should be performed in the safe mode; when the category of the server indicates that the interaction should be performed in the safe mode, analyze a response from the server; if the analyzed response is a webpage, generate a trigger configured to launch the browser in the safe mode to display the webpage; generate a temporary webpage with a script containing the trigger, wherein the script is configured to evaluate at least one criterion to determine whether to display the webpage by the browser; and execute the trigger to launch the browser in the safe mode to display the webpage based on an evaluation result of the at least one criterion by the script.

In another aspect, a non-transitory computer readable medium storing computer executable instructions is disclosed for launching a web browser in a safe mode. In this aspect medium includes instructions for intercepting a request from the browser to access electronic information from a server; determining a category of the server to indicate whether interaction between the browser and the server should be performed in the safe mode; when the category of the server indicates that the interaction should be performed in the safe mode, analyzing a response from the server; if the analyzed response is a webpage, generating a trigger configured to launch the browser in the safe mode to display the webpage; generating a temporary webpage with a script containing the trigger, wherein the script is configured to evaluate at least one criterion to determine whether to display the webpage by the browser; and executing the trigger to launch the browser in the safe mode to display the webpage based on an evaluation result of the at least one criterion by the script.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for launching a web browser in a safe mode. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In one example aspect, the launching of a browser in a safe mode includes launching the browser by a security application (e.g., an antivirus application) in a secure environment where all changes to the browser's settings, configuration, etc. (e.g., saved files, cookies, history of websites visited, and the like) are inaccessible beyond the limits of the secure environment.

Figure 1:
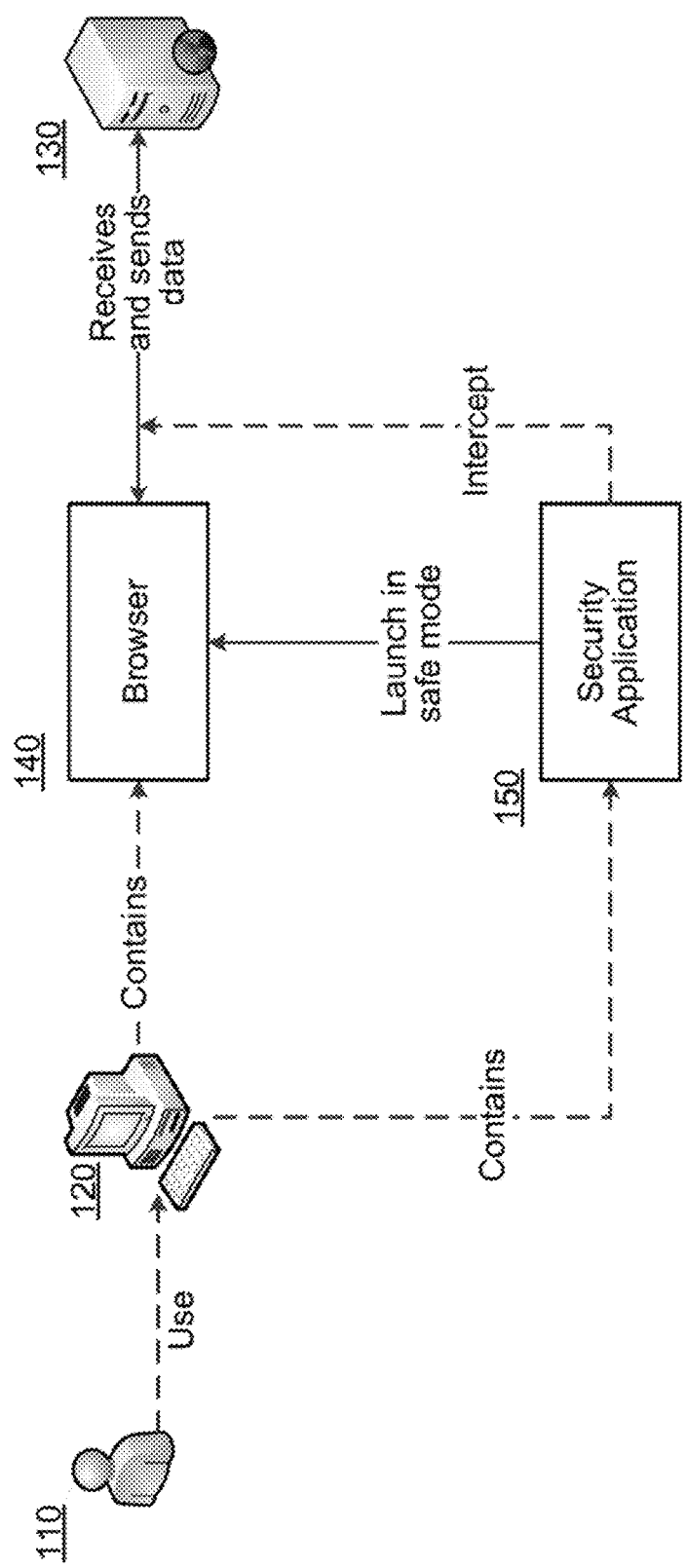
FIG. 1 illustrates an exemplary system of a user working in a network using a browser.

FIG. 1 illustrates an exemplary system of a user working in a network using a browser. As shown, a user 110, working on a computing device 120 (e.g., a personal computer, a mobile telephone, a notebook or the like), can access one or more servers 130. The servers 130 may be web servers, containing various webpages, mail servers, database servers and the like. In one example aspect, the user 110 can access the server 130 using a web browser 140. In one example aspect, a security application 150 (e.g., an antivirus application) may be installed on the computing device 120 of the user 110.

When the user 110 attempts to access the server 130 by the web browser 140, the computing device 120 generates a request to display a particular webpage containing a Universal Resource Locator ("URL"). In one example aspect, the security application 150 may be configured to intercept this request and determine whether certain actions should be performed for additional protection for the user 110.

Thus, according to one example aspect, the security application 150, depending on a category determined for the server 130 (for example, based on its URL), may alert the user 110 as to an insecure website (e.g., a phishing site) residing on the server 130, block access to the website, and conceal an advertisement situated on the website, for example. Furthermore, in one example aspect, the security application 150 may launch the web browser 140 in a safe mode when the user 110 accesses a website that is categorized as a particular type of website (e.g., "web banking") as determined by the security application 150.

In one example aspect, the security applications may use a categorization module (not shown) to determine the category of a website. The categorization module may be located locally on the user's computer or on a remote security server. Categorization of websites may be used to prevent a user from viewing unwanted websites. For example, for computers secured with parental control software, it is important that the child did not get access to websites with violent or mature content. If a website is categorized as malicious or phishing (stealing passwords on bankcard), the security application may block access to this web site. The categorization is based on the analysis of the content of the site (ideally—all pages) to identify the categories of content and the presence of harmful mechanisms. In another example aspect, the security application 150 may not determine the category for the website, but use a remote database that contains a list of websites for which categories and/or actions of the security application 150 are predetermined.

It is noted that when the browser 140 is launched by the security application 150 in the safe mode, the computing device 120 may need to determine whether to display the result of the user's request in the form of a webpage. It is further contemplated that there are possible instances where the request to a website that require browser 140 to be launched in a safe mode does not come from the user 110. Thus, for example, if:

the web browser 140 is being used by a browser extension which, when the web browser 140 is launched, access sites requiring the web browser 140 to run in a safe mode;

based on the website history by the user 110, when the web browser 140 is launched there may be displayed "tiles" containing links to the most often visited websites of the user 110, including websites requiring that the web browser 140 is launched in safe mode;

websites are preloaded in the web browser 140 (i.e., when the user 110 manually initiates the entry of an address, and the web browser (e.g., Google Chrome®) loads the webpage of the site from the incomplete address);

there is no favicon ("favorites icon", also known as a shortcut icon) on the website and in place of the favicon there is returned webpage with the website contents, the web browser 140 may be launched by the security application 150 in safe mode when this is not required. This may adversely effect the user's 110 browsing experience.

Figure 2:
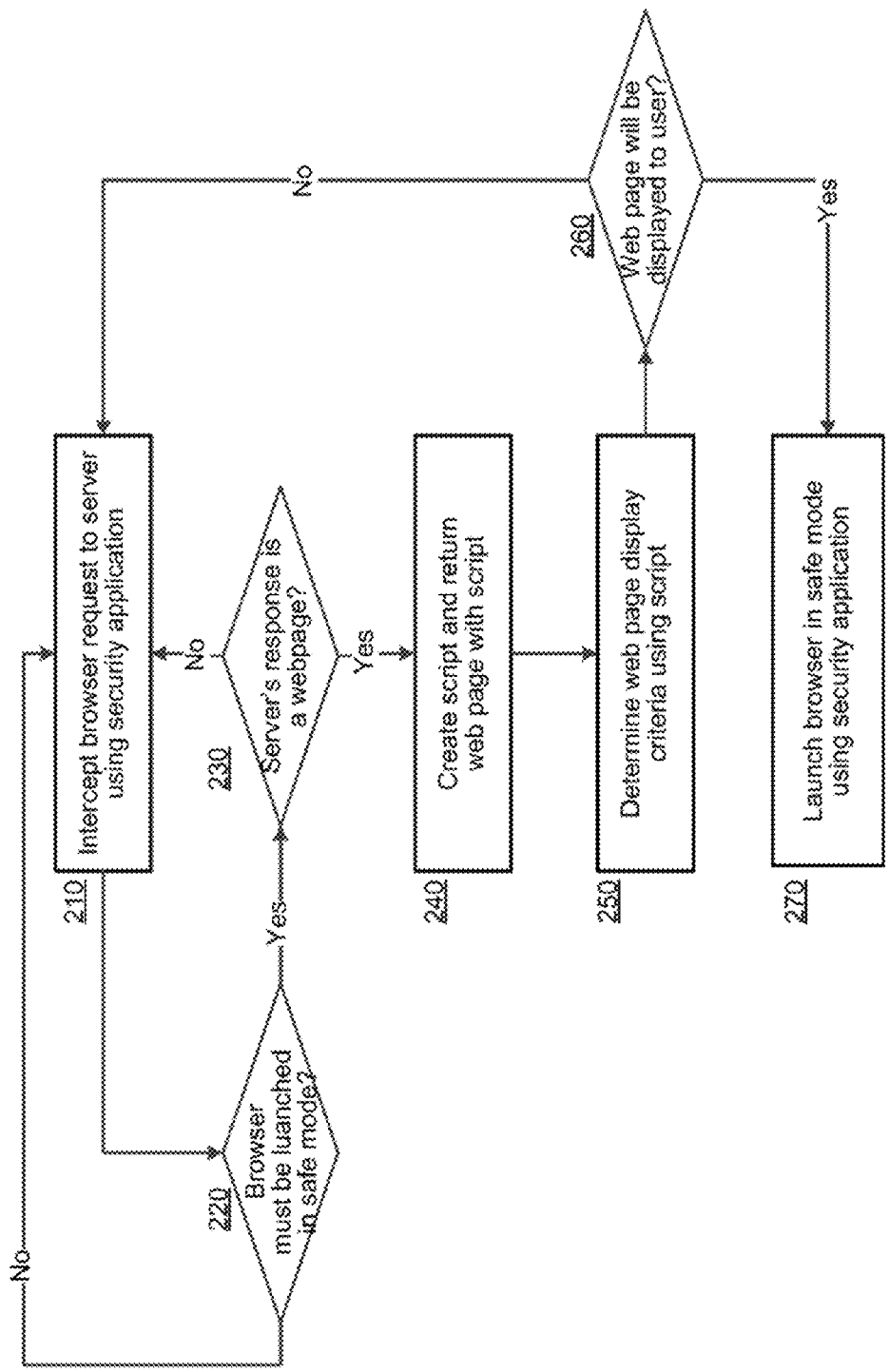
FIG. 2 illustrates a method of launching a browser in a safe mode according to an exemplary aspect.

FIG. 2 illustrates an example method of launching a browser in a safe mode. As shown, in the initial step 210, the security application 150 may intercept a request from the web browser 140 to the server 130 to access electronic information, such as a website. At step 220, the computing device 120 may determine whether the browser 140 needs to be launched in a safe mode for connection to the server 130. As described above, this determination may be performed by the security application 150, for example, with the use of a website categorization module (not shown) that may check the contents of the server 130, or with the use of an external database(s) that contains security policies for communicating with the server 130. If, at step 220, the computing device 120 determines that the web browser 140 does not need to be launched and operated in the safe mode for communicating and working with the server 130, the method returns to step 210. At this point, the web browser 140 may be launched in a normal mode to display webpages from server 130 in one example aspect.

If, at step 220, the computing device 120 determines that the browser 140 should be launched and operated in the safe mode to communicate with the server 130, then, at step 230, the security application 150 may analyze the data received from the server 130 in response to the request transmitted by the computing device 120. If, at step 230, the security application 150 determines that the data received from the server 130 is not a webpage (for example) the response is an image or streaming video), the image or streaming video is launched by the web browser 140 and the method returns to step 210. Alternatively, if the response from server 130 is a webpage, then at step 240 the security application 150 may create a new unique URL, after activation of which the security application 150 may launch the web browser 140 in the safe mode (hereinafter referred to as a "trigger"). In various aspects, the security application may open the webpage in a new window of the browser or in a new tab of the browser if the browser already running in the safe mode. Next, at step 240, instead of the response of the server 130 to the web browser 140, the security application 150 may generate and return to the web browser 140 a temporary blank webpage with a special script (e.g., javascript) for testing if the webpage should be displayed by the browser. In one example aspect, the script may include the trigger. In another example aspect, the script may also contain the original URL of the webpage requested from the server. In yet another aspect, the script may be altered by the security application 150, for example, depending on the version and type of web browser 140, so that the script is properly executed by the web browser 140.

Using the script in step 250, the security application 150 may determine whether to display the response from the server 130 to the user 110 in the form of a webpage. This determination may be performed using various criteria and obtaining an evaluation result of the criteria that indicates whether to display the webpage in the web browser 140. More particularly, in one aspect, the script uses a criterion to test whether the temporary webpage is displayed in the active window of the web browser 140. For example, a webpage might not be displayed in the window of the web browser 140 if the request to the server 130 comes from an extension installed in the web browser 140. The testing may be performed within 100-200 milliseconds in order to be unnoticeable to the user. In one example aspect, the test may be performed not for all website, but only to sites that require browser to operate in safe mode.

In another aspect, the determination as to whether the result can be displayed to the user 110 in the form of a webpage can be based on a criterion that checks whether or not a delayed event has taken place. Thus, if the webpage is displayed in the active window of the web browser 140, the event may be its image for creation of a "tile". In this case, the web browser 140 displays the webpage in its entirety, and all events and scripts are launched. However, the web browser 140 may not carry out the scripts for creation of a "tile" for an infinite duration, but may terminate them after a short time. In one aspect, a delayed event with a timeout (e.g., 130 milliseconds) is added to the script. The timeout may be chosen by trial and error, for example, so as to be minimal and the event following the timeout may not be performed on virtual machines with different capability and in different web browsers 140 in the case of creating "tiles". An example of such a delayed event is writing to a file.

In yet another aspect, the determination as to whether the result can be displayed to the user 110 in the form of a webpage uses a criterion that determines whether a webpage is being displayed in a frame (i.e., a region of the browser window for presenting a separate webpage), or whether the webpage is not being displayed in a full-screen frame. For example, control elements (e.g., "widgets") on webpages are often displayed in frames. In one example, the security application 150 is able to determine whether the control element is performing the authorization since this may be displayed on a website loaded via the HTTP protocol, i.e., an HTTPS page. Yet another example is 3D-Secure forms (i.e., a protocol that is used as an additional layer of security for online transactions with credit and debit cards with a two-factor authentication of the user 110), which often have a fixed size and, therefore, are opened in a frame. For such forms, the launching and operation of the web browser 140 in safe mode is not germane, since by the time the form is displayed, the operations requiring security have already been performed and, thus, no further protection is required.

It is noted that in one aspect, the script observes events that change the conditions for checking criteria. In the case of a change of events, a new test may be performed. Thus, for example, the preliminary loading of a webpage(s) in browsers 140 (for example, in Google Chrome®) will occur in a mode hidden from the user 110. Furthermore, web browsers 140 enable observation of events by a provided application programming interface (API), for example. The script can observe the event of changing the flag for concealment from the user 110. If an event is intercepted where the flag has changed during the execution of the script (for example, before the performance of a delayed event), the script may start the execution from the beginning according to an exemplary aspect.

In step 260, if the security application 150 determines that the result of a request will be displayed to the user 110 in the form of a webpage, the script jumps to the trigger for execution to cause the security application 150 to launch the browser 140 in the safe mode (step 270). In one aspect, the security application 150 returns to the web browser 140 a webpage that indicates the successful opening of the given webpage in another window of the web browser 140. If, at step 260, the security application 150 determines that the webpage will not be displayed to the user 110, the method returns to step 210.

In one aspect, if the checking criteria used in the script are not fulfilled, the script reports this result to the security application 150. The script may report its decision, for example, by another jump to the original URL and setting a special cookie (e.g., a small fragment of data sent by the web server 130 and stored on the computer of the user 110). In this case, the cookie may serve as a marker that the jump should be ignored by the security application 150.

In yet another aspect, for instances when the execution of scripts in the web browser 140 is prevented for the user 110, a "<noscript>" section may be present in the body of a temporary webpage containing the checking script, which section performs an explicit jump to the trigger. In this case, no checks will be performed, but the web browser 140 will be launched in the safe mode.

It should be noted that the described method can be used not only for running a web browser 140 in safe mode, but also for improving the quality of collecting statistics on the user's navigation (e.g., navigating to different websites), since the disclosed method enables a collection of statistics not by quantity of jumps in the traffic, but by the number of webpages actually opened by the user 110.

Figure 3:
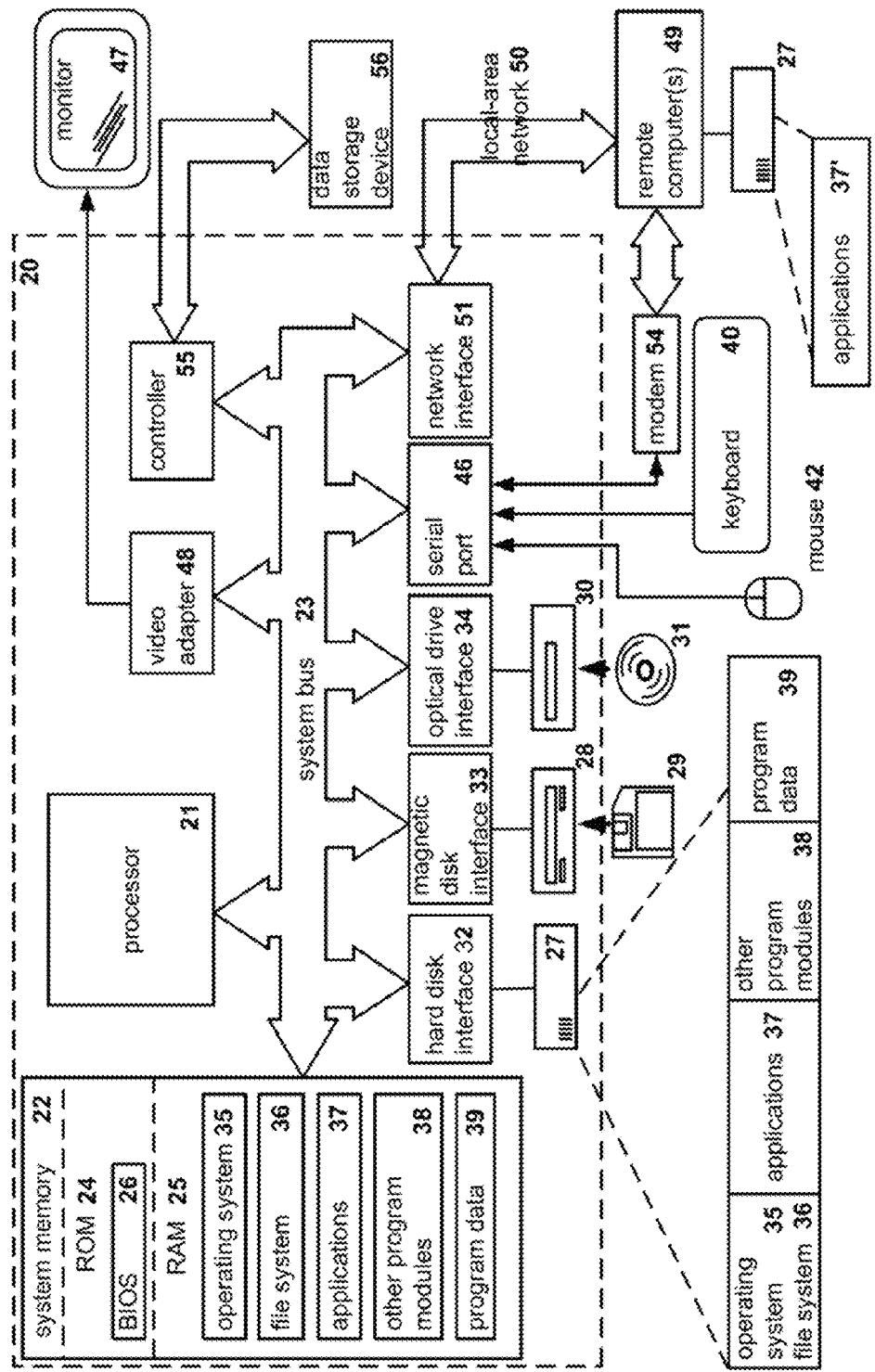
FIG. 3 illustrates an example of a general-purpose computer system on which the disclosed systems and method can be implemented.

FIG. 3 illustrates an example of a general-purpose computer system (which may be a personal computer or a server)

on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for launching a web browser in a safe mode, the method comprising:
   intercepting a request from the web browser to access data from a server;
   determining, by a hardware processor, whether the browser is required to operate in a safe mode when displaying data from the server;
   when the browser is required to operate in the safe mode, analyzing, by the hardware processor, the data received from the server;
   when the received data includes a webpage, generating, by the hardware processor, a temporary webpage containing a script for evaluating at least one criterion for determining whether to display the webpage received from the server by the browser;
   executing the script contained in the temporary webpage by the browser; and based on an evaluation result of the at least one criterion by the script, launching the browser in the safe mode to display the webpage received from the server;
   wherein determining whether the browser is required to operate in the safe mode includes determining a category of the server based on at least one of contents of the server and at least one security policy associated with the server.

2. The method of claim 1, wherein the step of determining whether the browser is required to operate in the safe mode includes determining a category of the server based on contents of the server and at least one security policy associated with the server.

3. The method of claim 1, wherein the at least one criterion includes at least one of whether the webpage is currently displayed in an active window of the browser, whether a delayed event has occurred relating to the display of the webpage by the browser, and whether the webpage is currently displayed from a frame of the browser.

4. The method of claim 1, further comprising:
   detecting a change in at least one condition used by the script to evaluate the at least one criterion; and
   restarting the script if to evaluate the at least one criterion if the change in the at least one condition is detected.

5. The method of claim 1, wherein, if the analyzed response is not a webpage, displaying the response on the browser in an unsafe mode.

6. The method of claim 1, wherein the script of the temporary webpage contains an original URL of the webpage provided by the server.

7. The method of claim 6, wherein, when the script has not completed an evaluation of the at least one criterion, the method comprises setting a cookie for the webpage to indicate that execution of the trigger to launch the browser in the safe mode should not be performed.

8. A system for launching a web browser in a safe mode, the system comprising:
   a hardware processor configured to:
      intercept a request from the web browser to access data from a server;
      determine whether the browser is required to operate in a safe mode when displaying data from the server;
      when the browser is required to operate in the safe mode, analyze the data received from the server;
      when the received data includes a webpage, generate a temporary webpage containing a script for evaluating at least one criterion for determining whether to display the webpage received from the server by the browser;
      execute the script contained in the temporary webpage by the browser; and
      based on an evaluation result of the at least one criterion by the script, launch the browser in the safe mode to display the webpage received from the server
      wherein to determine whether the browser is required to operate in a safe mode when displaying data from the server, the processor further configured to determine a category of the server based on at least one of contents of the server and at least one security policy associated with the serve.

9. The system of claim 8, wherein to determine whether the browser is required to operate in a safe mode when displaying data from the server, the processor further configured to determine a category of the server based on contents of the server and at least one security policy associated with the server.

10. The system of claim 8, wherein the at least one criterion includes at least one of whether the webpage is currently displayed in an active window of the browser, whether a delayed event has occurred relating to the display of the webpage by the browser, and whether the webpage is currently displayed from a frame of the browser.

11. The system of claim 8, wherein the hardware processor is further configured to:
   detect a change in at least one condition used by the script to evaluate the at least one criterion; and
   restart the script if to evaluate the at least one criterion if the change in the at least one condition is detected.

12. The system of claim 8, wherein, if the analyzed response is not a webpage, the hardware processor is further configured to display the response on the browser in an unsafe mode.

13. The system of claim 8, wherein the script of the temporary webpage contains an original URL of the webpage.

14. The system of claim 13, wherein, when the script has not completed an evaluation of the at least one criterion, the hardware processor is further configured to set a cookie for the webpage to indicate that execution of the trigger to launch the browser in the safe mode should not be performed.

15. A non-transitory computer readable medium storing computer executable instructions for launching a web browser in a safe mode, including instructions for:
   intercepting a request from the web browser to access data from a server;
   determining whether the browser is required to operate in a safe mode when displaying data from the server;
   when the browser is required to operate in the safe mode, analyzing the data received from the server;
   when the received data includes a webpage, generating a temporary webpage containing a script for evaluating at least one criterion for determining whether to display the webpage received from the server by the browser;
   executing the script contained in the temporary webpage by the browser; and
   based on an evaluation result of the at least one criterion by the script, launching the browser in the safe mode to display the webpage received from the server
   wherein the determining whether the browser is required to operate in the safe mode includes determining a category of the server based on at least one of contents of the server and at least one security policy associated with the server.

16. The non-transitory computer readable medium of claim 15, wherein the determining whether the browser is required to operate in the safe mode includes determining a category of the server based on contents of the server and at least one security policy associated with the server.

17. The non-transitory computer readable medium of claim 15, wherein the at least one criterion includes at least one of whether the webpage is currently displayed in an active window of the browser, whether a delayed event has occurred relating to the display of the webpage by the browser, and whether the webpage is currently displayed from a frame of the browser.

18. The non-transitory computer readable medium of claim 15, further comprising instructions for:
 detecting a change in at least one condition used by the script to evaluate the at least one criterion; and
 restarting the script if to evaluate the at least one criterion if the change in the at least one condition is detected.

19. The non-transitory computer readable medium of claim 15, wherein, if the analyzed response is not a webpage, the instruction further display the response on the browser in an unsafe mode.

20. The non-transitory computer readable medium of claim 15, wherein the script of the temporary webpage contains an original URL of the webpage, and when the script has not completed an evaluation of the at least one criterion, the instructions further include setting a cookie for the webpage to indicate that execution of the trigger to launch the browser in the safe mode should not be performed.

* * * * *